US012574566B2

(12) United States Patent
Li et al.

(10) Patent No.: US 12,574,566 B2
(45) Date of Patent: Mar. 10, 2026

(54) BLOCKWISE QUALITY CONTROL OF IMAGE PROCESSING

(71) Applicant: Telefonaktiebolaget LM Ericsson (publ), Stockholm (SE)

(72) Inventors: Yun Li, Lund (SE); Jacob Ström, Stockholm (SE); Christopher Hollmann, Uppsala (SE); Du Liu, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/722,994

(22) PCT Filed: Dec. 23, 2021

(86) PCT No.: PCT/EP2021/087605
§ 371 (c)(1),
(2) Date: Jun. 21, 2024

(87) PCT Pub. No.: WO2023/117122
PCT Pub. Date: Jun. 29, 2023

(65) Prior Publication Data
US 2025/0056066 A1 Feb. 13, 2025

(51) Int. Cl.
*H04N 19/86* (2014.01)
*H04N 19/117* (2014.01)
(Continued)

(52) U.S. Cl.
CPC ........... *H04N 19/86* (2014.11); *H04N 19/117* (2014.11); *H04N 19/124* (2014.11);
(Continued)

(58) Field of Classification Search
CPC .... H04N 19/86; H04N 19/117; H04N 19/124; H04N 19/136; H04N 19/176; H04N 19/182; H04N 19/42
See application file for complete search history.

(56) References Cited

U.S. PATENT DOCUMENTS

2019/0273948 A1* 9/2019 Yin .......................... G06N 3/045

OTHER PUBLICATIONS

H. Zhao et al., "CBREN: Convolutional Neural Networks for Constant Bit Rate Video Quality Enhancement," in IEEE Transactions on Circuits and Systems for Video Technology, vol. 32, No. 7, pp. 4138-4149, Jul. 2022, doi: 10.1109/TCSVT.2021.3123621. (Year: 2022).*

(Continued)

*Primary Examiner* — Justin W Rider
(74) *Attorney, Agent, or Firm* — Rothwell, Figg, Ernst & Manbeck, P.C.

(57) ABSTRACT

A method for encoding or decoding an image is provided. The method comprises obtaining pixel values of pixels included in the image. The method further comprises converting the pixel values into convoluted values using a convolution network that comprises a first convolution layer, wherein the first convolution layer is configured to receive first input values and generate first output values using a convolution operation. The method further comprises obtaining first quality values, and (i) combining the first quality values with the pixel values, thereby generating the first input values or (ii) combining the first quality values with the first output values, thereby generating first combined values.

20 Claims, 7 Drawing Sheets

(51) Int. Cl.
| | |
|---|---|
| *H04N 19/124* | (2014.01) |
| *H04N 19/136* | (2014.01) |
| *H04N 19/176* | (2014.01) |
| *H04N 19/182* | (2014.01) |
| *H04N 19/42* | (2014.01) |

(52) U.S. Cl.
CPC ......... *H04N 19/136* (2014.11); *H04N 19/176* (2014.11); *H04N 19/182* (2014.11); *H04N 19/42* (2014.11)

(56) References Cited

OTHER PUBLICATIONS

International Search Report and Written Opinion issued in International Application No. PCT/EP2021/087605 dated Jul. 25, 2022 (11 pages).

Choi, Y. et al., "Variable Rate Deep Image Compression With a Conditional Autoencoder", 2019 IEEE/CVF International Conference on Computer Vision (ICCV), Oct. 27, 2019 (9 pages).

Lin, C. et al., "AHG11: Variable rate end-to-end image compression", Joint Video Experts Team (JVET) of ITU-T SG 16 WP 3 and ISO/IEC JTC 1/SC 29, Document: JVET-U0102, 21st Meeting, teleconference, Jan. 6-15, 2021 (7 pages).

Minnen, D. et al., "Joint Autoregressive ad Hierarchical Priors for Learned Image Compression", Sep. 8, 2018 (22 pages).

Wang, S. et al., "[VCM] End-to-end image compression towards machine vision for object detection", ISO/IEC JTC 1/SC 29/WVG m56416, Online—Apr. 2021 (6 pages).

Rosewarne, C. et al., "High Efficiency Video Coding (HEVC) Test Model 16 (HM 16) Improved Encoder Description Update 15", 22nd Meeting of Joint Video Experts Team (JVET) of ITU-T SG 16 WP 3 and ISO/IEC JTC 1/SC 29, No. JVET-V1002-v1 Apr. 20-28, 2021.

* cited by examiner $(-1 \times 3) + (0 \times 0) + (1 \times 1) +$
$(-2 \times 2) + (0 \times 6) + (2 \times 2) +$
$(-1 \times 2) + (0 \times 4) + (1 \times 1) = -3$ Source pixel Convolution filter Destination pixel Feature maps    Pooled Feature maps    Feature maps    Pooled Feature maps Input    Convolution Layer 1    Pooling 1    Convolution Layer 2    Pooling 2

400

102

500

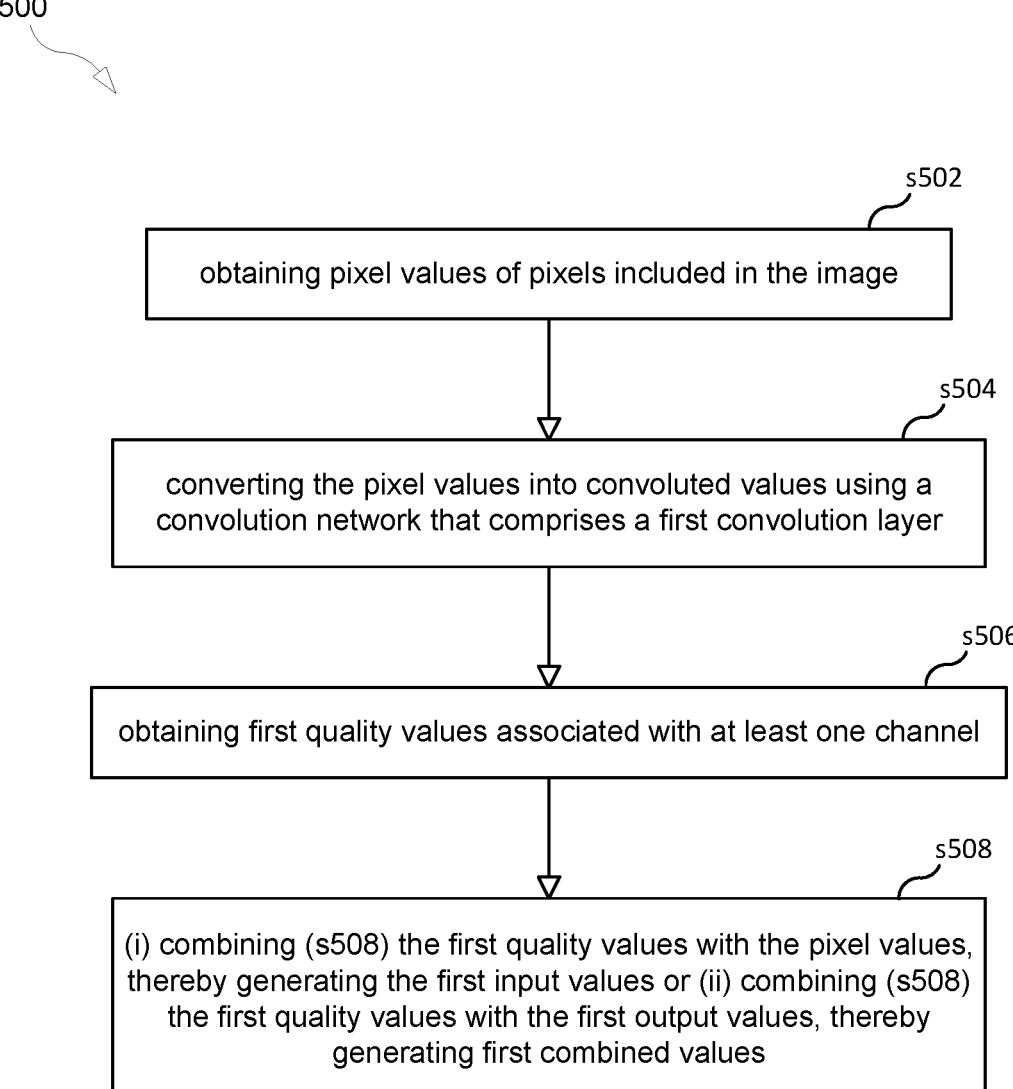

s502 obtaining pixel values of pixels included in the image s504 converting the pixel values into convoluted values using a convolution network that comprises a first convolution layer s506 obtaining first quality values associated with at least one channel s508

(i) combining (s508) the first quality values with the pixel values, thereby generating the first input values or (ii) combining (s508) the first quality values with the first output values, thereby generating first combined values

FIG. 5

700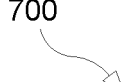
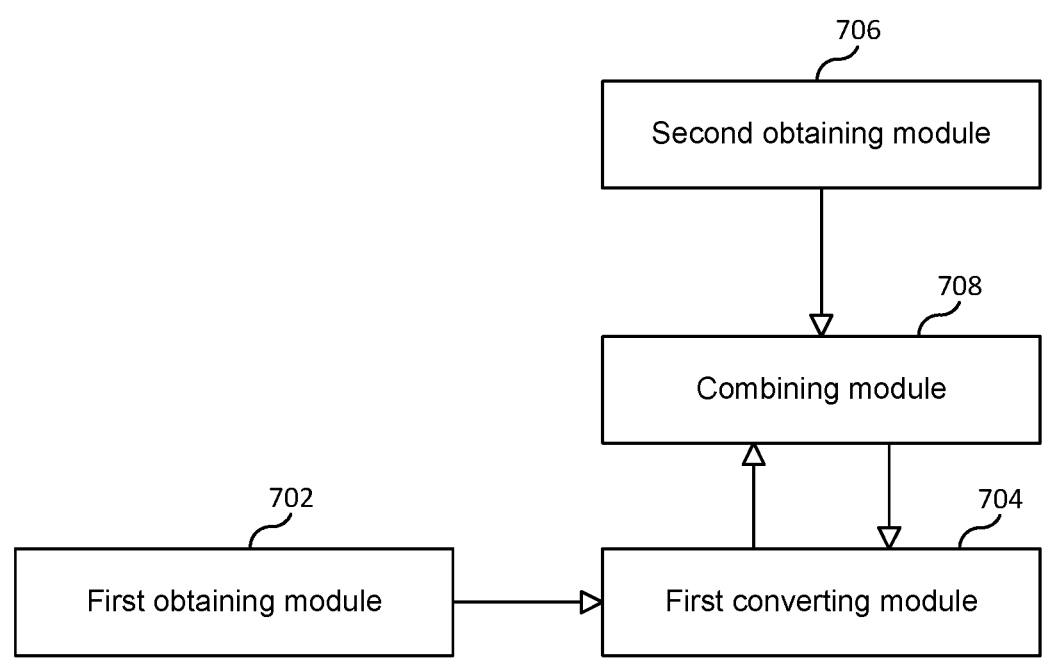
FIG. 7

BLOCKWISE QUALITY CONTROL OF IMAGE PROCESSING

CROSS REFERENCE TO RELATED APPLICATIONS

This application is a 35 U.S.C. § 371 National Stage of International Patent Application No. PCT/EP2021/087605, filed 2021 Dec. 23, which is incorporated by this reference.

TECHNICAL FIELD

Disclosed are embodiments related to methods and systems for performing blockwise quality control of image processing.

BACKGROUND

During recent years, significant success has been achieved for image compression with autoencoders. The autoencoder is a data-driven neural network (NN). Through training one NN model of fixed weights, both fixed rate and variable rate for the compression system can be achieved. For the variable-rate autoencoders, a parameter lambda is usually incorporated in each layer of the convolutional NN to modify the activation of that layer with respect to the lambda. The training is performed end-to-end by varying lambda to minimize the rate-distortion function.

One example of an implementation of an autoencoder where a lambda value is introduced to the convolutions in the analysis and synthesis networks can be found in C. Lin, F. Chen, and L. Wang. "AHG11: Variable rate end-to-end image compression," JVET-U0102, January 2021. Here the lambda value is used to determine a rate-distortion trade-off, resulting in the lambda value influencing the bit rate as well as the quality. The described method has the advantage that it is possible to train a single model that can produce a multitude of bit rates. A small lambda value indicates a low bit rate and low quality, whereas a high lambda value indicates a high bit rate and high quality.

Modern video compression standards such as High Efficiency Video Coding (HEVC) have a feature called adaptive Quantization Parameter (aQP). This tool allows the encoder to adjust the Quantization Parameter (QP) on a block-by-block basis. In the reference encoder for HEVC, an example method to determine the QP offset is disclosed in Rosewarne, K. Sharman, R. Sjöberg, and G. J. Sullivan. "High Efficiency Video Coding (HEVC) Test Model 16 (HM 16) Encoder Description Update 15," JVET-V1002, April 2021. Here the activity in a block is determined by calculating the variance of the luma samples. The idea is that too few bits are spent on low-activity regions, such as in the texture of a face, compared to what is needed for a perceptually convincing picture quality. At the same time, too many bits are spent on high-activity regions such as moving trees where it is anyway hard for human perception to pick up errors. Therefore, blocks with low activity are assigned a negative offset during encoding, indicating that a lower QP should be used, resulting in increasing the bit rate. Conversely, if a block has a high activity level, a positive offset is encoded, meaning that a higher QP should be used, resulting in a stronger quantization and a lower bit rate.

However, only the offset is written into the bitstream. The standard specification of HEVC only describes the decoder needed to decode a bitstream that has been encoded with an HEVC-compliant encoder. Thus, there is no description of how the encoding algorithm should look like. This includes any methods for aQP. Companies that implement encoders can decide independently as to whether they want to include any aQP functionalities and how the details of such an algorithm are laid out.

SUMMARY

Certain challenges exist. For example, each bit-rate point, conventional encoders produce a compressed image having constant quality. In the conventional encoders, the application of adaptive Quantization Parameter (QP) on the spatial domain to vary the quality of different parts of an image cannot be achieved at the inference and/or compression stage.

Accordingly, in one aspect, there is provided a method for encoding and/or decoding an image. The method comprises obtaining pixel values of pixels included in the image and converting the pixel values into convoluted values (e.g., y) using a convolution network that comprises a first convolution layer, wherein the first convolution layer is configured to receive first input values and generate first output values using a convolution operation. The method further comprises obtaining first quality values (e.g., the output of the first NN, the NN may also contain nonlinear layers) associated with at least one channel, and (i) combining the first quality values with the pixel values, thereby generating the first input values or (ii) combining the first quality values with the first output values, thereby generating first combined values.

In another aspect, there is provided a computer program comprising instructions which when executed by processing circuitry cause the processing circuitry to perform the method described above.

In another aspect, there is provided an image processing system for encoding and/or decoding an image. The system is configured to obtain pixel values of pixels included in the image and convert the pixel values into convoluted values using a convolution network that comprises a first convolution layer, wherein the first convolution layer is configured to receive first input values and generate first output values using a convolution operation. The system is further configured to obtain first quality values (e.g., the output of the first NN) associated with at least one channel; and (i) combine the first quality values with the pixel values, thereby generating the first input values or (ii) combine the first quality values with the first output values, thereby generating first combined values.

In another aspect, there is provided an apparatus comprising: a memory; and processing circuitry coupled to the memory, wherein the apparatus is configured to perform the method described above.

In another aspect, there is provided an apparatus for encoding and/or decoding an image. The apparatus comprises a first obtaining module for obtaining pixel values of pixels included in the image, a first converting module for converting the pixel values into convoluted values using a convolution network that comprises a first convolution layer, wherein the first convolution layer is configured to receive first input values and generate first output values using a convolution operation, a second obtaining module for obtaining first quality values associated with at least one channel, and a combining module for (i) combining the first quality values with the pixel values, thereby generating the first input values or (ii) combining the first quality values with the first output values, thereby generating first combined values.

Embodiments of this disclosure provide the following advantages: (1) The compression system according to some embodiments of this disclosure is capable of changing the quality of an image in the spatial domain adaptively at runtime based on a QP matrix; (2) the system has the capability of producing a bitstream adapted to dynamic network bandwidth changes; and (3) the system can lower the system energy consumption by avoiding using multiple trained NN systems.

The accompanying drawings, which are incorporated herein and form part of the specification, illustrate various embodiments.

BRIEF DESCRIPTION OF THE DRAWINGS

FIG. 5 shows a process according to some embodiments.

FIG. 7 shows an apparatus according to some embodiments.

DETAILED DESCRIPTION

In some embodiments of this disclosure, a QP matrix is incorporated into some or all convolutional layers of an autoencoder compression system. For example, a lambda value associated with each subblock of one or more QP values included in the QP matrix may be determined and the output of the activation from each convolution layer in the system can be modified using the lambda values. The lambda value associated with each subblock of one or more QP values may be varied randomly during a training process. The QP matrix may be used to compute the rate-distortion as the loss function and the system can be trained to minimize this loss function.

Figure 1:
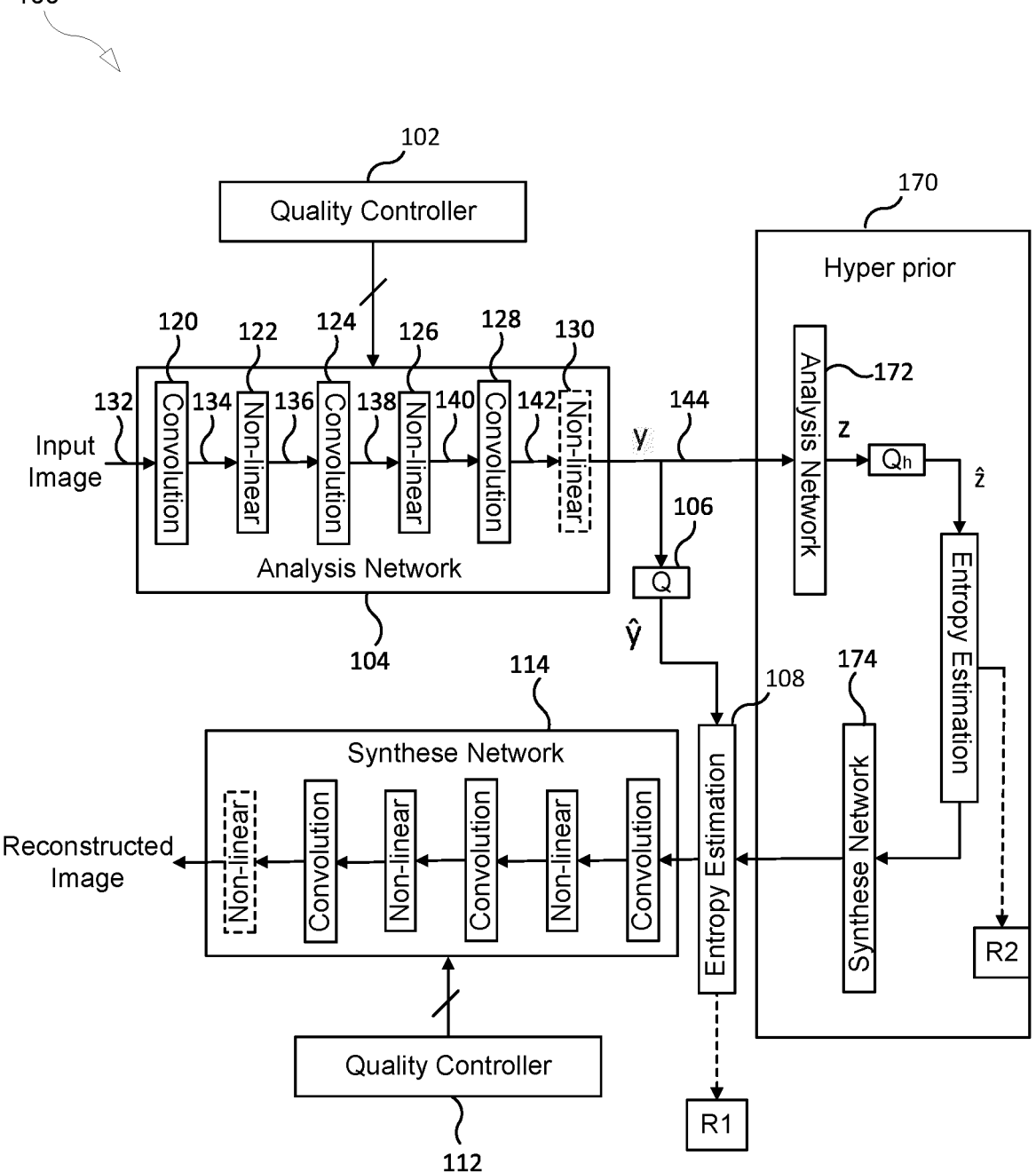
FIG. 1 shows a system according to some embodiments.

FIG. 1 shows an image processing system 100 according to some embodiments. The system 100 is configured to encode and decode an image. The system 100 comprises an encoding quality controller 102, an encoding analysis network 104, a quantization unit 106, an entropy estimation unit 108, a decoding quality controller 112, and a decoding synthesis network 114.

The system 100 is configured to receive an input image 132. The input image 132 may be a full image or a portion of a full image. In some embodiments, the input image 132 corresponds to a video frame included in a sequence of frames of a video. The input image 132 contains a plurality of pixels having input pixel values.

In the system 100, the input image 132 is provided to the analysis network 104. In some embodiments, the analysis network 104 is a convolution neural network (CNN). The CNN 104 is configured to convert the input image 132 into final convoluted values 144.

As shown in FIG. 1, the CNN 104 may comprise a first convolution layer 120, a first non-linear activation layer 122, a second convolution layer 124, a second non-linear activation layer 126, a third convolution layer 128, and an optional third non-linear activation layer 130. The number of the convolution layers and/or the non-linear activation layers shown in FIG. 1 are provided for illustration purpose only and do not limit the embodiments of this disclosure in any way. Each of the first convolution layer 120, the second convolution layer 124, and the third convolution layer 128 may be a CNN.

The first convolution layer 120 is configured to receive the input image 132 and perform a convolution on the input image 132, thereby generating first convoluted values 134. FIG. 2 illustrates how the first convolution layer 120 may perform a convolution on the input image 132.

Figure 2A:
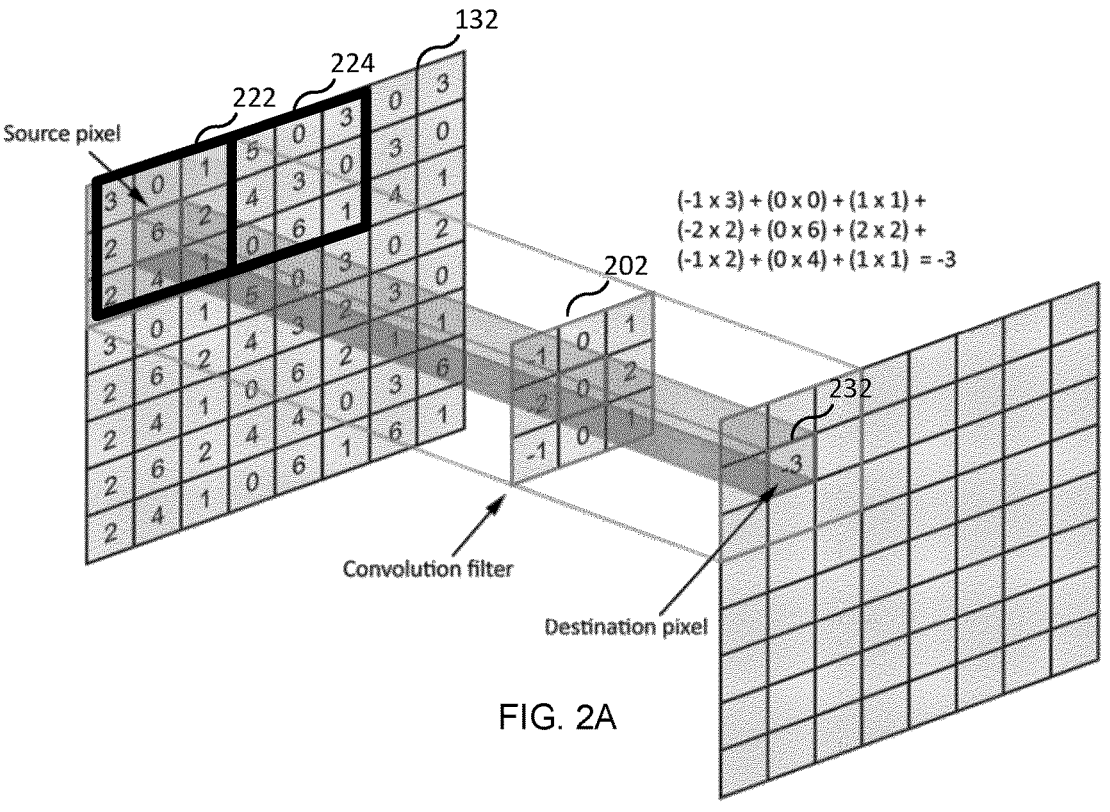
FIG. 2A shows an exemplary convolution operation.

FIG. 2A shows the input image 132 having a resolution of 8×8 pixels. In the first convolution layer 120, there may be provided a convolution filter (a.k.a., a kernel) 202. During the convolution, the convolution filter 202 moves from a block (e.g., 222) of the input image 132 to another block (e.g., 224) of the input image 132, thereby generating a convoluted value 232 for each block. The resolutions of the input image 132 and the convolution filter 202 are provided in FIG. 2 for illustration purpose only and do not limit the embodiments of this disclosure in any way.

As shown in FIG. 2A, during the convolution, each pixel value included in each block (e.g., 222) is multiplied by a convolution filter value located at a corresponding location in the convolution filter 202. For example, the value "3" corresponding to the top left corner of the block 222 is multiplied by the convolution filter value "−1" at the top left corner of the convolution filter 202. Similarly, the value "2" corresponding to the left middle position of the block 222 is multiplied by the convolution filter value "−2" at the left middle position of the convolution filter 202. Performing the above multiplication for all pixel values included in the block 222 would result in nine values. The convoluted value 232 may be generated by summing up the nine values.

The convolution operation illustrated in FIG. 2A is merely one example of the convolution that can be performed by each of the first, second, and third convolution layers 120, 124, and 128.

Figure 2B:
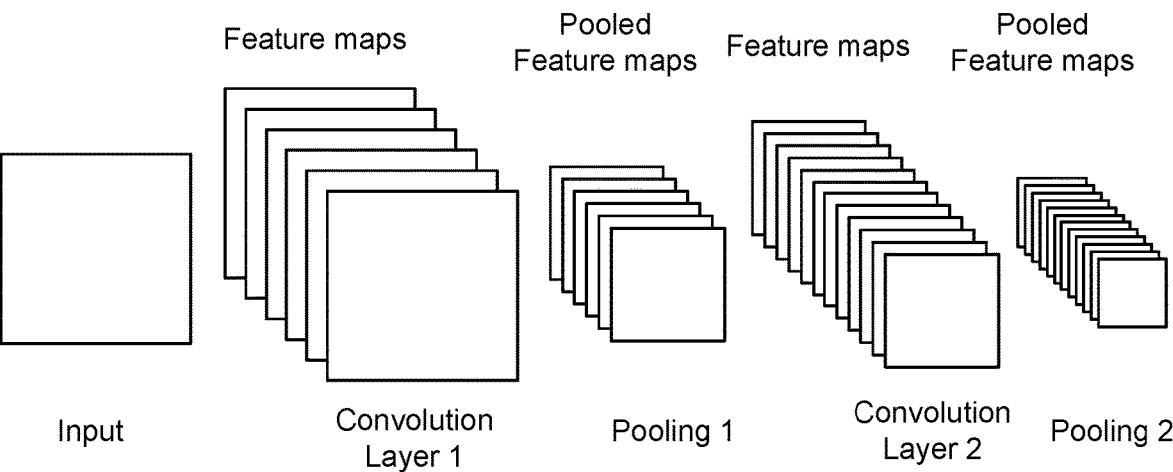
FIG. 2B shows an exemplary convolution operation.

In some embodiments, there may be provided more than one convolution filter in the convolution layer(s) 120, 124, and/or 128. For example, the first convolution layer 120 may include seven convolution filters (kernels). In such embodiments, as shown in FIG. 2B, the convolution layer 120 generates seven sets of first convoluted values each of which corresponds to a particular kernel.

Conventionally, these convoluted values are provided to another convolution layer for another convolution. However, in some embodiments of this disclosure, the first convoluted values 134 are combined with outputs of the quality controller 102.

Figure 3:
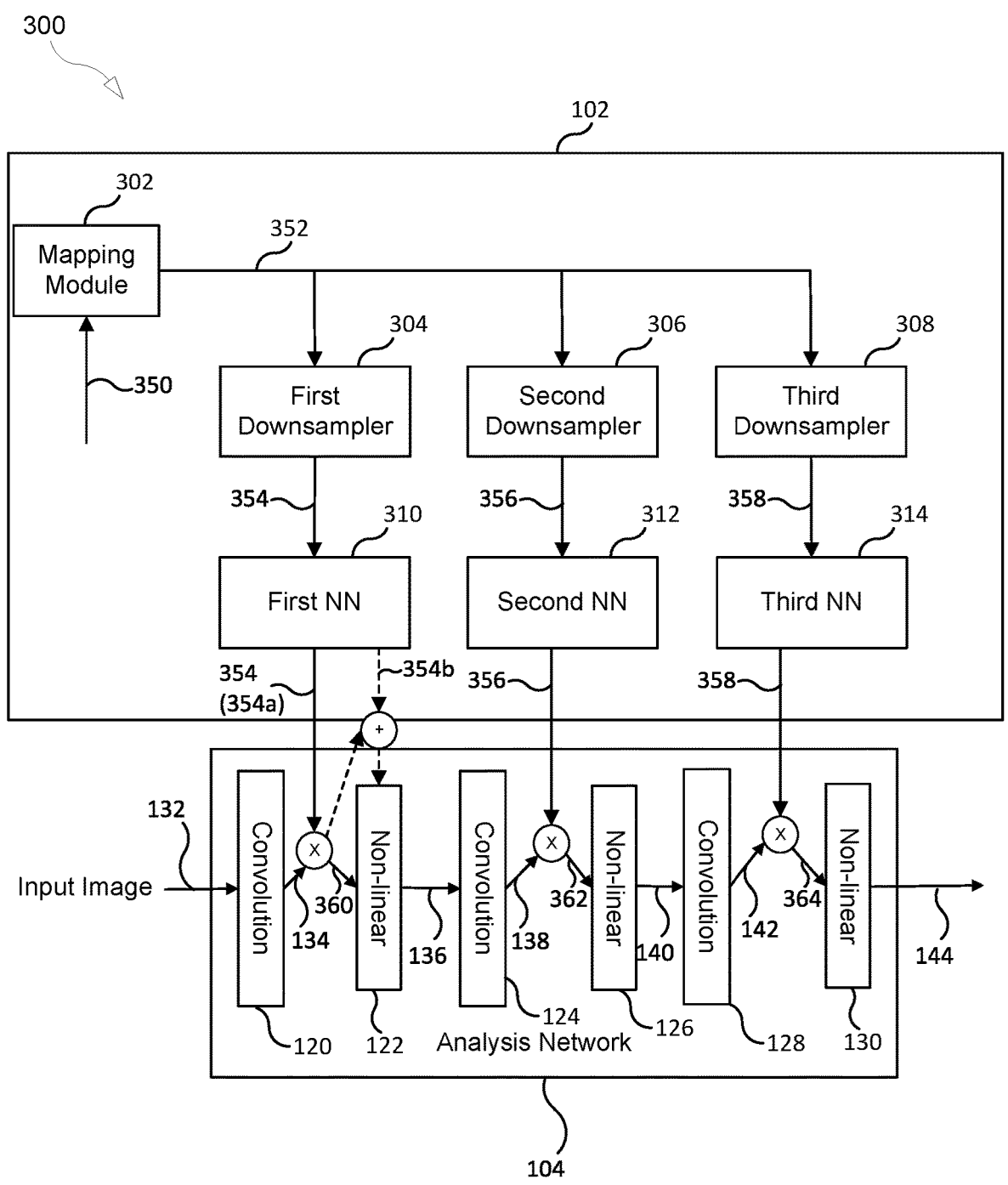
FIG. 3 shows a structure of an apparatus according to some embodiments.

FIG. 3 shows a structure 300 of the encoding quality controller 102 according to some embodiments.

The structure 300 may comprise a mapping module 302, a first downsampler 304, a second downsampler 306, a third downsampler 308, a first neural network 310, a second neural network 312, and a third neural network 314. Each of the first, second, and third neural networks may be a convolutional NN or a fully connected NN.

The mapping module 302 is configured to receive Quantization Parameter (QP) values 350 included in a QP matrix. In one embodiment, the QP values included in the QP matrix are the QP values provided in the H.265 standard. This QP matrix may be needed to control the bit rate and the quality of each block within an image.

The mapping module 302 is configured to convert a matrix of the QP values 350 into lambda values 352 by, for example, using a predetermined table. For example, the QP value of 30 may be mapped to the lambda value of 0.01, the QP value of 25 may be mapped to the lambda value of 0.05, and the QP value of 20 may be mapped to the lambda value of 0.1. In some embodiments, the predetermined table may provide one-to-one mapping between a QP value and a lambda value. In other embodiments, the QP matrix may be divided into multiple subblocks having the same size. For example, in case the QP matrix is a 32×32 matrix, the QP matrix may be divided into 16 subblocks each having the size of an 8×8 matrix. A constant lambda value may be assigned to each of the subblocks.

The plurality of lambda values 352 outputted from the mapping module 302 may be provided to the first, second, and third downsamplers 304, 306, and 308. The first down-sampler 304 may be configured to convert the plurality of lambda values 352 into a first set of downsampled values (a.k.a., attentional parameter (AP) values) 354. In one embodiment, the number of the downsampled values included in the first set of downsampled values is same as the number of the first convoluted values 134.

For example, in case the input image 132 has a resolution of 32×32, the first convolution layer 120 may convert the input image 132 into a 16×16 matrix of the plurality of first convoluted values 134. In this scenario, in case the QP matrix is a 32×32 matrix, the mapping module 302 may output a 32×32 matrix of the lambda values 352 and the first downsampler 304 may downsample the 32×32 matrix of the lambda values 352, thereby generating a 16×16 matrix of downsampled values 354.

The matrix of the downsampled values 354 may be processed via the first neural network 310 and then provided to the encoding convolution network 104. The first neural network 310 (and the second and third neural networks) may be used to provide more flexible scaling with respect to the QP matrix and the outputs of the convolution layers.

For simplification, the outputs of the neural networks 310-314 are labeled as same as the inputs of the neural networks 310-314. For example, even though the first neural network 310 receives the downsampled values 354 and generates processed downsampled values, for simplification, the processed downsampled values outputted from the first neural network 310 is labeled as the downsampled values 354.

In the structure 300 shown in FIG. 3, the downsamplers 304-308 and the neural networks 310-314 are provided separately. However, in other embodiments, the function of the downsampler(s) may be performed by the neural net-work(s). For example, the first neural network 310 may perform the downsampling function of the first downsam-pler 304. In such embodiments, the first downsampler 304 may be omitted. In other words, the first neural network 310 may receive the lambda values 352 and output the down-sampled values 354.

The CNN 104 may be configured to combine the matrix of the first convoluted values 134 and the matrix of the downsampled values 354. For example, the CNN 104 may perform an element-wise multiplication of the matrix of the first convoluted values 134 and the matrix of the down-sampled values 354, thereby generating a matrix of first quality adjusted values 360. The first quality adjusted values 360 may be provided to the second convolution layer 124 after they are processed through the first non-linear activa-tion layer 122.

In some embodiments, two or more kernels may be provided in the first neural network 310 (and/or the second/third neural networks 312 and 314). For example, if two kernels are provided in the first neural network 310, the first neural network 310 may generate two groups of down-sampled values—e.g., 354a and 354b. In these embodiments, the CNN 104 may perform an element-wise multi-plication of the matrix of the first convoluted values 134 and the matrix of the downsampled values 354a and then add the matrix of the downsampled values 354b to the matrix resulting from the element-wise multiplication.

In some embodiments, the first convolution layer may output N groups of convoluted values (e.g., using N kernels for the convolution operation). One group of convoluted values may in a matrix form. In such embodiments, the same number of kernels, i.e., N kernels, may be used in the first neural network 310. Using the N kernels the first neural network 310 may generate N groups of processed and downsampled values. In such scenario, each convolutional layer of the CNN 104, e.g., CNN 120 may perform an element-wise multiplication of the matrix of each group of the N groups of the convoluted values and the matrix of each group of the N groups of the processed and downsampled values.

In other embodiments, the first neural network 310 may generate N×2 groups of downsampled values (e.g., N1 groups and N2 groups) instead of N groups of downsampled values. In such embodiments, the each convolutional layer of CNN 104, e.g., CNN 120 may perform an element-wise multiplication of the matrix of each group of the N groups of the convoluted values and the matrix of each group of the N1 groups of the downsampled values and then add the matrix of each group of the N2 groups of downsampled values to the matrix resulting from the element-wise multi-plication.

Referring back to FIG. 3, in case the matrix of the first quality adjusted values 360 has a resolution of 16×16, the second convolution layer 124 may convert the first quality adjusted values 360 into an 8×8 matrix of the plurality of second convoluted values 138. In this scenario, the second downsampler 306 may downsample the lambda values 352, thereby generating an 8×8 matrix of second downsampled values 356.

The matrix of the second downsampled values 356 may be provided to the CNN 104. The CNN 104 may be configured to combine the matrix of the second convoluted values 138 and the matrix of the second downsampled values 356. For example, the CNN 104 may perform an element-wise multiplication of the matrix of the second convoluted values 138 and the matrix of the second down-sampled values 356, thereby generating a matrix of second quality adjusted values 362. The second quality adjusted values 362 may be provided to the third convolution layer 128 after they are processed through the second non-linear activation layer 126.

In case the matrix of the second quality adjusted values 362 has a resolution of 8×8, the third convolution layer 128 may convert the second quality adjusted values 362 into a 4×4 matrix of the plurality of third convoluted values 142. In this scenario, the third downsampler 308 may down-sample the lambda values 352, thereby generating a 4×4 matrix of third downsampled values 358.

The matrix of the third downsampled values 358 may be provided to the CNN 104. The CNN 104 may be configured to combine the matrix of the third convoluted values 142 and the matrix of the third downsampled values 358. For example, the convolution network 104 may perform an element-wise multiplication of the matrix of the third con-voluted values 142 and the matrix of the third downsampled values 358, thereby generating a matrix of third quality adjusted values 364. The third quality adjusted values 364 may be outputted as the final convoluted values 144.

Even though FIG. 3 shows that the structure 300 of the encoding quality controller 102 includes the mapping module 302, in some embodiments, the mapping module 302 may be omitted. In such embodiments, the encoding quality controller 102 may obtain the lambda values 352 directly (e.g., receiving the lambda values 352 from another entity) and provide the obtained lambda values 352 to the first, second, and third downsamplers 304, 306, and 308.

Also even though, in the embodiments shown in FIG. 3, a downsampler and/or a neural network is provided for every convolution layer, in other embodiments, the downsampler and/or the neural network may not be provided for every convolution layer but may be provided only some of the convolution layers.

Figure 4:
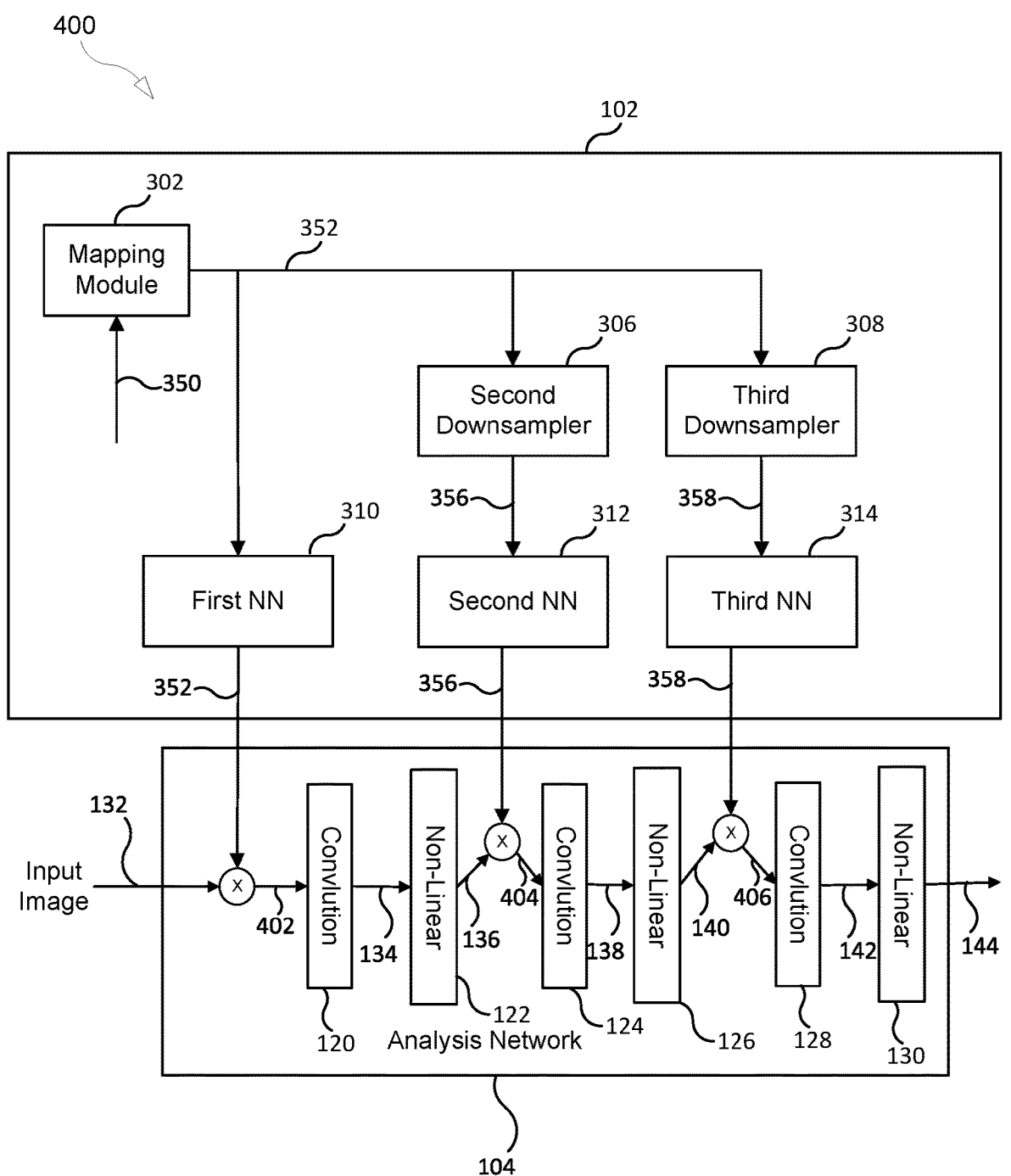
FIG. 4 shows a structure of an apparatus according to some embodiments.

In the structure 300 shown in FIG. 3, the outputs of the encoding quality controller 102 are combined with the outputs of the first, second, and third convolution layers 304, 306, and 308. However, in other embodiments, the outputs of the encoding quality controller 102 are combined with the inputs of the first, second, and third convolution layers 120, 124, and 128. FIG. 4 shows such embodiments.

In the arrangement 400 shown in FIG. 4, the plurality of lambda values 352 outputted from the mapping module 302 are provided to the second and third downsamplers 306 and 308. The first downsampler 304 is omitted in the arrangement 400 because there is no need to downsample the lambda values 314.

For example, in case the QP matrix is a 32×32 matrix, the mapping module 302 may output a 32×32 matrix of the lambda values 352. In this case, since the input image 132 is a 32×32 matrix of the pixel values, the lambda values 352 (that is processed through the neural network 310) may be combined with the pixel values without reducing the number of the lambda values 352.

Thus, in this embodiment, the CNN 104 may combine the first set of the lambda values 352 (that are processed via the first neural network 310) with the pixel values of the input image 132. For example, the CNN 104 may perform an element-wise multiplication of the matrix of the processed lambda values 352 and the matrix of the pixel values of the input image 132, thereby generating a matrix of quality adjusted values 402. In another example, the CNN 104 may perform a concatenation of the matrix of the processed lambda values 352 and the matrix of the pixel values of the input image 132, to generate a matrix of quality adjusted values 402. The quality adjusted values 402 may be provided to the first convolution layer 120. The first convolution layer 120 may perform a convolution on the quality adjusted values 402, thereby generating the first convoluted values 134. The first non-linear activation layer 122 converts the first convoluted values 134 into first activation values 136.

The CNN 104 may combine the first activation values 136 with the second downsampled values 356. For example, the CNN 104 may perform an element-wise multiplication of the matrix of the first activation values 136 and the matrix of the second downsampled values 356, thereby generating a matrix of second quality adjusted values 404. The second quality adjusted values 404 may be provided to the second convolution layer 124. The second convolution layer 124 may perform a convolution on the second quality adjusted values 404, thereby generating the second convoluted values 138. The second non-linear activation layer 126 converts the second convoluted values 138 into second activation values 140.

The CNN 104 may combine the second activation values 140 with the third downsampled values 358. For example, the CNN 104 may perform an element-wise multiplication of the matrix of the second activation values 140 and the matrix of the third downsampled values 358, thereby generating a matrix of third quality adjusted values 406. The third quality adjusted values 406 may be provided to the third convolution layer 128. The third convolution layer 128 may perform a convolution on the third quality adjusted values 406, thereby generating the third convoluted values 142. The third non-linear activation layer 130 converts the third convoluted values 142 into the final convoluted values 144.

Even though the combined operation of the quality controller and a CNN is described above using the quality controller 102 and the CNN 104 included at the encoder side, the above explanation is equally applicable to the quality controller 112 and the synthesis network 114 which may be another CNN.

In some embodiments, the system 100 may include a hyperprior module 170. The hyperprior module 170 is used to estimate the probability distribution of the latent variables y in the main compression network. The estimation is performed with the synthesis network 174 from the latent variable z, the hyperprior. The analysis network 172 and the synthesis network 174 included in the hyperprior module 170 can be CNNs, which may also progressively perform down-sampling and up-sampling respectively in the layers.

In some embodiments, an additional quality controller may be provided for each of the analysis network 172 and the synthesis network 174. In such embodiments, the additional quality controller and each of the analysis network 172 and the synthesis network 174 may operate together in the same manner the quality controller 102 and the CNN 104 operate together as described above.

The system 100 may be trained end to end. In some embodiments, a lambda value associated with a subblock of QP values included in the QP matrix may be varied randomly from a set of preselected lambda values during the training process. The system 100 may be trained by minimizing the rate-distortion loss function: $\lambda D + R_1 + R_2$, where D is the distortion, and $R_1$ and $R_2$ are the estimated entropy rates for the coding of the latent variables and the hyperprior variables respectively. The quantization process is denoted as Q in the figure.

FIG. 5 shows a process 500 for encoding and/or decoding an image. The process 500 may begin with step s502. Step s502 comprises obtaining pixel values of pixels included in the image. Step s504 comprises converting the pixel values into convoluted values (e.g., y) using a convolution network that comprises a first convolution layer, wherein the first convolution layer is configured to receive first input values and generate first output values using a convolution operation. Step s506 comprises obtaining first quality values (e.g., the output of the first NN) associated with at least one channel. Step s508 comprises (i) combining the first quality values with the pixel values, thereby generating the first input values or (ii) combining the first quality values with the first output values, thereby generating first combined values.

In some embodiments, combining the first quality values with the pixel values comprises performing an element-wise multiplication or a concatenation of a matrix of the first quality values and a matrix of the pixel values, or combining the first quality values with the first output values comprises performing an element-wise multiplication of the matrix of the first quality values and a matrix of the first output values.

In some embodiments, the convolution network comprises a second convolution layer, the second convolution layer is configured to receive second input values and generate second output values using a convolution operation, and the method further comprises: obtaining second quality values (e.g., the output of the second NN) and (i) generating the second input values using the second quality values or (ii) combining the second quality values with the second output values, thereby generating second combined values.

In some embodiments, the convolution network comprises a first non-linear activation layer, the first non-linear activation layer is configured to receive the first combined values and generate first activation values based on the first combined values, and the second input values are the first combined values.

In some embodiments, the method further comprises obtaining a plurality of distortion control values (e.g., the lambda values) for controlling a degree of distortion during the encoding or the decoding, wherein the first quality values are determined based on the plurality of distortion control values.

In some embodiments, the method further comprises converting the plurality of distortion control values into the first quality values using at least a neural network; and combining the first quality values with the pixel values, thereby generating the first input values.

In some embodiments, the number of first quality values is equal to the number of the pixel values.

In some embodiments, the method further comprises converting (e.g., downsampling) the plurality of distortion control values into a first group of downsampled values, wherein the number of the downsampled values included in the first group is less than the number of the distortion control values.

In some embodiments, the number of the downsampled values is equal to the number of the first output values.

In some embodiments, obtaining the plurality of distortion control values (e.g., the lambda values) comprises: obtaining quantization parameter (QP) values included in a QP matrix; and converting the QP values into the plurality of distortion control values using a predetermined mapping table.

In some embodiments, the method further comprises converting the plurality of distortion control values into a second group of downsampled values, wherein the number of the downsampled values included in the second group is equal to the number of the second output values, and the number of the second output values is less than the number of the first output values.

In some embodiments, the method further comprises converting the plurality of distortion control values into the first quality values using at least a first filter; converting the plurality of distortion control values into supplemental quality values using at least a second filter; performing the element-wise multiplication of the matrix of the first quality values and the matrix of the first output values; and adding a matrix of the supplemental quality values to the result of the element-wise multiplication.

In some embodiments, the coding system can be implemented in a device to device, device to cloud, or cloud to cloud communication system. At the sender side, the images are compressed by using the encoder neural network, and the compressed information is sent to the receiver side along with/or without the compressed quality/lambda matrix. At the receiver side the images are decoded with the received compressed information. The sender side can control the Region of Interest (ROI) coding based on the bandwidth constraint or based on the feedback from the receiver.

Figure 6:
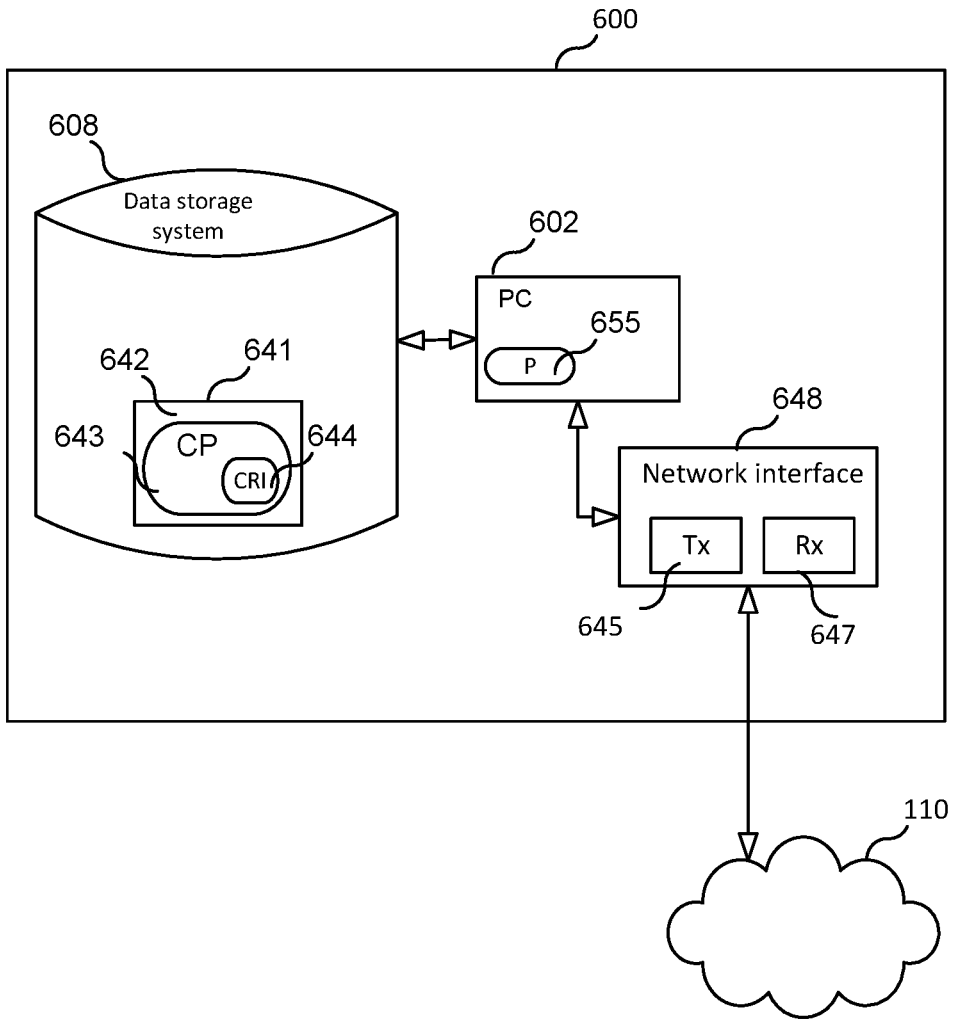
FIG. 6 shows an apparatus according to some embodiments.

FIG. 6 is a block diagram of an apparatus 600 for implementing the encoding function and/or the decoding function of the system 100, according to some embodiments. When apparatus 600 implements a decoder, apparatus 600 may be referred to as a "decoding apparatus 600," and when apparatus 600 implements an encoder, apparatus 600 may be referred to as an "encoding apparatus 600." As shown in FIG. 6, apparatus 600 may comprise: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 600 may be a distributed computing apparatus); at least one network interface 648 comprising a transmitter (Tx) 645 and a receiver (Rx) 647 for enabling apparatus 600 to transmit data to and receive data from other nodes connected to a network 110 (e.g., an Internet Protocol (IP) network) to which network interface 648 is connected (directly or indirectly) (e.g., network interface 648 may be wirelessly connected to the network 110, in which case network interface 648 is connected to an antenna arrangement); and a storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes apparatus 600 to perform steps described herein (e.g., steps described herein with reference to the flow charts). In other embodiments, apparatus 600 may be configured to perform steps described herein without the need for code. That is, for example, PC 602 may consist merely of one or more ASICs. Hence, the features of the embodiments described herein may be implemented in hardware and/or software.

FIG. 7 shows an apparatus 700 for encoding and/or decoding an image, according to some embodiments. The apparatus comprises a first obtaining module 702 for obtaining pixel values of pixels included in the image and a first converting module for converting the pixel values into convoluted values using a convolution network that comprises a first convolution layer. The first convolution layer is configured to receive first input values and generate first output values using a convolution operation. The apparatus further comprises a second obtaining module for obtaining first quality values associated with at least one channel and a combining module for (i) combining the first quality values with the pixel values, thereby generating the first input values or (ii) combining the first quality values with the first output values, thereby generating first combined values.

In some embodiments, combining the first quality values with the pixel values comprises performing an element-wise multiplication or a concatenation of a matrix of the first quality values and a matrix of the pixel values, or combining the first quality values with the first output values comprises performing an element-wise multiplication of the matrix of the first quality values and a matrix of the first output values.

In some embodiments, the convolution network comprises a second convolution layer, and the second convolution layer is configured to receive second input values and generate second output values using a convolution operation. The second obtaining module may be configured to obtain second quality values, and the combining module may be configured to (i) generate the second input values using the second quality values or (ii) combine the second quality values with the second output values, thereby generating second combined values.

In some embodiments, the convolution network comprises a first non-linear activation layer, the first non-linear activation layer is configured to receive the first combined values and generate first activation values based on the first combined values, and the second input values are the first combined values.

In some embodiments, the apparatus further comprises a third obtaining module for obtaining a plurality of distortion control values for controlling a degree of distortion during the encoding or the decoding, wherein the first quality values are determined based on the plurality of distortion control values.

In some embodiments, the apparatus further comprises a second converting module for converting the plurality of distortion control values into the first quality values using at least a neural network, wherein the combining module is configured to combine the first quality values with the pixel values, thereby generating the first input values.

In some embodiments, the number of first quality values is equal to the number of the pixel values.

In some embodiments, the second converting module is configured to convert the plurality of distortion control values into a first group of downsampled values, wherein the number of the downsampled values included in the first group is less than the number of the distortion control values.

In some embodiments, the number of the downsampled values is equal to the number of the first output values.

In some embodiments, obtaining the plurality of distortion control values comprises: obtaining quantization parameter (QP) values included in a QP matrix; and converting the QP values into the plurality of distortion control values using a predetermined mapping table.

In some embodiments, the second converting module is configured to convert the plurality of distortion control values into a second group of downsampled values, the number of the downsampled values included in the second group is equal to the number of the second output values, and the number of the second output values is less than the number of the first output values.

In some embodiments, the second converting module is configured to convert the plurality of distortion control values into the first quality values using at least a first filter, the second converting module is further configured to convert the plurality of distortion control values into supplemental quality values using at least a second filter, the combining module is configured to perform the element-wise multiplication of the matrix of the first quality values and the matrix of the first output values, and the combining module is further configured to add a matrix of the supplemental quality values to the result of the element-wise multiplication.

The invention claimed is:

1. A method for encoding and/or decoding an image comprising a first set of pixel values, the method comprising:

obtaining the first set of pixel values;

obtaining a first set of quality values based on a first set of quantization parameters (QPs) used for controlling a bit rate or a quality of a block within the image;

using the first set of pixel values, the first set of quality values, and a first layer of a convolutional network to produce input values for a second layer of the convolutional network, wherein the first layer of the convolutional network is a first convolution layer of the convolutional network, wherein using the first set of pixel values, the first set of quality values, and the first convolution layer of the convolutional network to produce the input values for the second layer of the convolutional network comprises:

i) using the first convolution layer to perform a convolution operation on the first set of pixel values to produce first convoluted values and producing the input values for the second layer by combining the first convoluted values with the first set of quality values, or ii) combining the first set of pixel values with the first set of quality values to produce a first set of quality adjusted values and using the first convolution layer to perform a convolution operation on the first set of quality adjusted values to produce the input values for the second layer of the convolutional network.

2. The method of claim 1, wherein combining the first convoluted values with the first set of quality values comprises performing an element-wise multiplication or a concatenation of a matrix of the first set of quality values and a matrix of the first convoluted values, or combining the first set of pixel values with the first set of quality values comprises performing an element-wise multiplication of the matrix of the first quality values and a matrix of the first set of pixel values.

3. The method of claim 1, further comprising:

obtaining a second set of quality values; and using the input values for the second layer of the convolutional network, the second set of quality values, and the second layer of the convolutional network to produce output values, wherein the second layer of the convolutional network is a second convolution layer of the convolutional network, wherein using the input values for the second layer of the convolutional network, the second set of quality values, and the second convolution layer of the convolutional network to produce output values comprises:

i) using the second convolution layer to perform a convolution operation on the input values for the second layer of the convolutional network to produce convoluted input values and producing the output values by combining the convoluted input values with the second set of quality values, or ii) combining the input values for the second layer of the convolutional network with the second set of quality values to produce a first set of quality adjusted input values and using the second convolution layer to perform a convolution operation on the first set of quality adjusted input values to produce the output values.

4. The method of claim 3, wherein the convolutional network comprises a first non-linear activation layer, the first non-linear activation layer is configured to receive the input values for the second layer of the convolutional network and generate first activation values based on the first input values for the second layer of the convolutional network.

5. The method of claim 1, further comprising:
obtaining a plurality of distortion control values for controlling a degree of distortion during the encoding or the decoding, wherein
the first set of quality values are determined based on the plurality of distortion control values.

6. The method of claim 5, further comprising:
converting the plurality of distortion control values into the first set of quality values using at least a neural network; and
combining the first set of quality values with the first set of pixel values, thereby generating the input values for the second layer of the convolutional network.

7. The method of claim 5, further comprising:
converting the plurality of distortion control values into a first group of downsampled values, wherein the number of the downsampled values included in the first group is less than the number of the distortion control values.

8. The method of claim 5, wherein obtaining the plurality of distortion control values comprises:
obtaining the first set of QPs included in a QP matrix; and
converting the first set of QPs into the plurality of distortion control values using a predetermined mapping table.

9. The method of claim 8, further comprising:
converting the plurality of distortion control values into a second group of downsampled values, wherein
the number of the downsampled values included in the second group is equal to the number of the output values, and
the number of the output values is less than the number of the input values for the second layer of the convolutional network.

10. The method of claim 5, comprising
converting the plurality of distortion control values into the first set of quality values using at least a first filter;
converting the plurality of distortion control values into supplemental quality values using at least a second filter;
performing the element-wise multiplication of the matrix of the first set of quality values and the matrix of the input values for the second layer of the convolutional network; and
adding a matrix of the supplemental quality values to the result of the element-wise multiplication.

11. A non-transitory computer readable storage medium storing a computer program comprising instructions which when executed by processing circuitry cause the processing circuitry to perform the method of claim 1.

12. An apparatus, the apparatus comprising:
a memory; and
processing circuitry coupled to the memory, wherein the apparatus is configured to perform a method comprising:
obtaining a first set of pixel values for an image;
obtaining a first set of quality values based on a first set of quantization parameters (QPs) used for controlling a bit rate or a quality of a block within the image;
using the first set of pixel values, the first set of quality values, and a first layer of a convolutional network to produce input values for a second layer of the convolutional network, wherein the first layer of the convolutional network is a first convolution layer of the convolutional network, wherein using the first set of pixel values, the first set of quality values, and the first convolution layer of the convolutional network to produce the input values for the second layer of the convolutional network comprises:
i) using the first convolution layer to perform a convolution operation on the first set of pixel values to produce first convoluted values and producing the input values for the second layer by combining the first convoluted values with the first set of quality values, or
ii) combining the first set of pixel values with the first set of quality values to produce a first set of quality adjusted values and using the first convolution layer to perform a convolution operation on the first set of quality adjusted values to produce the input values for the second layer of the convolutional network.

13. The apparatus of claim 12, wherein the operations further comprise:
combining the first convoluted values with the first set of quality values comprises performing an element-wise multiplication or a concatenation of a matrix of the first set of quality values and a matrix of the first convoluted values, or
combining the first set of pixel values with the first quality values comprises performing an element-wise multiplication of the matrix of the first quality values and a matrix of the first set of values.

14. The apparatus of claim 12, wherein the method further comprises:
obtaining a second set of quality values; and
using the input values for the second layer of the convolutional network, the second set of quality values, and the second layer of the convolutional network to produce output values, wherein the second layer of the convolutional network is a second convolution layer of the convolutional network, wherein
using the input values for the second layer of the convolutional network, the second set of quality values, and the second convolution layer of the convolutional network to produce output values comprises:
i) using the second convolution layer to perform a convolution operation on the input values for the second layer of the convolutional network to produce convoluted input values and producing the output values by combining the convoluted input values with the second set of quality values, or
ii) combining the input values for the second layer of the convolutional network with the second set of quality values to produce a first set of quality adjusted input values and using the second convolution layer to perform a convolution operation on the first set of quality adjusted input values to produce the output values.

15. The apparatus of claim 14, wherein
the convolutional network comprises a first non-linear activation layer,
the first non-linear activation layer is configured to receive the input values for the second layer of the convolutional network and generate first activation values based on the input values for the second layer of the convolutional network.

16. The apparatus of claim 12, wherein the method further comprises:
obtaining a plurality of distortion control values for controlling a degree of distortion during the encoding or the decoding, wherein the first set of quality values are determined based on the plurality of distortion control values.

17. The apparatus of claim 16, wherein the method further comprises:

converting the plurality of distortion control values into the first set of quality values using at least a neural network; and combining the first set of quality values with the first set of pixel values, thereby generating the input values for the second layer of the convolutional network.

18. The apparatus of claim 16, wherein obtaining the plurality of distortion control values comprises:

obtaining the first set of QPs included in a QP matrix; and converting the first set of QPs into the plurality of distortion control values using a predetermined mapping table.

19. The apparatus of claim 18, wherein the method further comprises:

converting the plurality of distortion control values into a second group of downsampled values, wherein the number of the downsampled values included in the second group is equal to the number of the output values, and the number of the output values is less than the number of the input values for the second layer of the convolutional network.

20. The apparatus of claim 16, wherein the method further comprises:

converting the plurality of distortion control values into the first set of quality values using at least a first filter;

converting the plurality of distortion control values into supplemental quality values using at least a second filter;

performing the element-wise multiplication of the matrix of the first set of quality values and the matrix of the input values for the second layer of the convolutional network; and adding a matrix of the supplemental quality values to the result of the element-wise multiplication.

* * * * *